(12) United States Patent
Gu et al.

(10) Patent No.: US 12,278,434 B2
(45) Date of Patent: Apr. 15, 2025

(54) THIN-FILM ANTENNA, DISPLAYING MODULE AND DISPLAYING DEVICE

(71) Applicant: BOE Technology Group Co., Ltd., Beijing (CN)

(72) Inventors: Penghao Gu, Beijing (CN); Xin Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/913,020

(22) PCT Filed: Nov. 2, 2021

(86) PCT No.: PCT/CN2021/128096
§ 371 (c)(1),
(2) Date: Sep. 20, 2022

(87) PCT Pub. No.: WO2022/205894
PCT Pub. Date: Oct. 6, 2022

(65) Prior Publication Data
US 2024/0170846 A1      May 23, 2024

(30) Foreign Application Priority Data
Apr. 2, 2021   (CN) .......................... 202110362865.2

(51) Int. Cl.
*H01Q 7/00*      (2006.01)
*H01Q 1/22*      (2006.01)
*H01Q 1/50*      (2006.01)

(52) U.S. Cl.
CPC ................ *H01Q 7/00* (2013.01); *H01Q 1/22* (2013.01); *H01Q 1/50* (2013.01)

(58) Field of Classification Search
CPC .. H01Q 7/00; H01Q 1/22; H01Q 1/50; H01Q 1/38; H01Q 1/08; H04B 5/26; G09F 9/30
See application file for complete search history.

(56) References Cited

U.S. PATENT DOCUMENTS

| 11,213,685 | B2* | 1/2022 | Oron ................... A61N 1/37229 |
| 2013/0000836 | A1* | 1/2013 | Matsumoto .............. H01Q 1/38 156/281 |

(Continued)

FOREIGN PATENT DOCUMENTS

| CN | 106098702 A | 11/2016 |
| CN | 109148541 A | 1/2019 |

(Continued)

OTHER PUBLICATIONS

Office Action dated Apr. 18, 2022, issued in counterpart CN Application No. 202110362865.2, with English Translation. (17 pages).

*Primary Examiner* — Seokjin Kim
(74) *Attorney, Agent, or Firm* — WHDA, LLP

(57) ABSTRACT

A thin-film antenna, a displaying module and a displaying device. The thin-film antenna includes a first region and a second region, and the thin-film antenna includes: an antenna functional layer, a first film layer and a lead-wire layer that are arranged in stack. The antenna functional layer includes an antenna coil, the antenna coil is located within the first region, the lead-wire layer includes a lead wire and a terminal connected to the lead wire, the terminal is located within the second region, and the lead wire and the antenna coil are connected by a via hole provided in the first film layer. The thin-film antenna according to the present embodiment may be adhered to the back surface of the display panel, and the component for shielding signals such as a middle frame is not required to be provided between the antenna and the display panel.

15 Claims, 6 Drawing Sheets

(56) References Cited

U.S. PATENT DOCUMENTS

| | | |
|---|---|---|
| 2016/0322156 A1* | 11/2016 | Yeh .......................... H04B 5/24 |
| 2017/0047361 A1 | 2/2017 | Xu et al. |
| 2018/0188432 A1* | 7/2018 | Choi ..................... G02B 5/3033 |
| 2018/0277954 A1* | 9/2018 | Lee .......................... H01Q 9/27 |
| 2018/0287243 A1* | 10/2018 | Ko .......................... H01Q 1/273 |
| 2019/0198974 A1 | 6/2019 | Ying |
| 2019/0363584 A1* | 11/2019 | Leem ..................... H01Q 13/00 |
| 2019/0372196 A1* | 12/2019 | Aso .......................... H04B 5/26 |
| 2020/0019264 A1* | 1/2020 | Kadota ................... G06F 3/044 |
| 2020/0119438 A1* | 4/2020 | Maruyama ............... H01Q 1/22 |
| 2020/0139136 A1* | 5/2020 | Oron .......................... H04B 5/77 |
| 2020/0194880 A1 | 6/2020 | Huh et al. |
| 2020/0266542 A1* | 8/2020 | Mu .......................... H10K 59/00 |
| 2020/0350668 A1* | 11/2020 | Kim .......................... H01Q 5/35 |
| 2020/0365626 A1* | 11/2020 | Lin ..................... G02F 1/13338 |
| 2020/0411990 A1* | 12/2020 | Nakamura ............. H01Q 21/06 |
| 2021/0034943 A1* | 2/2021 | Nakano ................ G11B 23/042 |
| 2021/0141426 A1* | 5/2021 | Kim .......................... H01Q 1/46 |
| 2022/0085846 A1* | 3/2022 | Attaran ..................... H04B 5/26 |
| 2022/0221350 A1* | 7/2022 | Lynch ..................... H05K 1/162 |
| 2022/0360298 A1* | 11/2022 | Shih .......................... H01Q 1/243 |
| 2022/0416403 A1* | 12/2022 | Choi ..................... G06K 19/077 |
| 2023/0032455 A1* | 2/2023 | Shin .......................... H01Q 1/48 |
| 2023/0268669 A1* | 8/2023 | Park .......................... H04B 1/48 |
| | | 455/566 |
| 2023/0368971 A1* | 11/2023 | Lu .......................... H01F 41/043 |

FOREIGN PATENT DOCUMENTS

| | | | |
|---|---|---|---|
| CN | 109792104 A | 5/2019 | |
| CN | 110082976 A | 8/2019 | |
| CN | 111033892 A | 4/2020 | |
| CN | 111883923 A | 11/2020 | |
| CN | 112364965 A | 2/2021 | |
| CN | 113067141 A | 7/2021 | |
| WO | WO-2006106982 A1 * | 10/2006 | ............. H01Q 1/243 |

* cited by examiner

THIN-FILM ANTENNA, DISPLAYING MODULE AND DISPLAYING DEVICE

CROSS-REFERENCE TO RELEVANT APPLICATIONS

The present disclosure claims the priority of the Chinese patent application filed on Apr. 2, 2021 before the CNIPA, China National Intellectual Property Administration with the application number of 202110362865.2 and the title of "THIN-FILM ANTENNA, DISPLAYING MODULE AND DISPLAYING DEVICE", which is incorporated herein in its entirety by reference.

TECHNICAL FIELD

The present disclosure relates to the technical field of displaying, and more particularly, to a thin-film antenna, a displaying module, and a displaying device.

BACKGROUND

Conventional mobile terminals are provided with various types of antennas, such as an NFC antenna and a wirelessly chargeable antenna. Those antennas are usually fixed to the positions of the mobile terminals such as the rear cover or the mainboard, and a component such as a middle frame is provided between the antenna and the screen. Due to the shielding effect to the antenna signals by the metal middle frame, it is extremely inconvenient for the terminal device with a screen folding outwardly to be used when using antenna functions such as NFC identification.

SUMMARY

The present disclosure provides a thin-film antenna, wherein the thin-film antenna comprises a first region and a second region, and the thin-film antenna comprises: an antenna functional layer, a first film layer and a lead-wire layer that are arranged in stack; and
  the antenna functional layer comprises an antenna coil, the antenna coil is located within the first region, the lead-wire layer comprises a lead wire and a terminal connected to the lead wire, the terminal is located within the second region, and the lead wire and the antenna coil are connected by a via hole provided in the first film layer.

In an alternative implementation, the lead wire comprises a first lead wire and a second lead wire, and the terminal comprises a first terminal and a second terminal;
  a first end of the first lead wire is connected to the first terminal, and a second end is connected to a head end of the antenna coil; and
  a first end of the second lead wire is connected to the second terminal, and a second end is connected to a tail end of the antenna coil.

In an alternative implementation, a second film layer is provided on one side of the antenna functional layer that is away from the lead-wire layer, and a third film layer is provided on one side of the lead-wire layer that is away from the antenna functional layer.

In an alternative implementation, a first adhesive film and a release film are provided in stack on one side of the third film layer that is away from the lead-wire layer, the first adhesive film is close to the third film layer, the release film is for being stripped from a surface of the first adhesive film when adhered to the thin-film antenna, and the first adhesive film and the release film are located within the first region; and
  a second adhesive film and a magnetic conductive material layer are provided in stack on one side of the second film layer that is away from the antenna functional layer, the second adhesive film is close to the second film layer, and the second adhesive film and the magnetic conductive material layer are located within the first region.

In an alternative implementation, a first adhesive film and a release film are provided in stack on one side of the second film layer that is away from the antenna functional layer, the first adhesive film is close to the second film layer, the release film is for being stripped from a surface of the first adhesive film when adhered to the thin-film antenna, and the first adhesive film and the release film are located within the first region; and
  a second adhesive film and a magnetic conductive material layer are provided in stack on one side of the third film layer that is away from the lead-wire layer, the second adhesive film is close to the third film layer, and the second adhesive film and the magnetic conductive material layer are located within the first region.

In an alternative implementation, a magnetic permeability of the magnetic conductive material layer is greater than or equal to 150 H/m under a frequency of 13.56 Mhz, and a magnetic loss is less than or equal to 100 W/m$^3$.

In an alternative implementation, an orthographic projection of the third film layer on the first film layer and an orthographic projection of the terminal on the first film layer do not overlap.

In an alternative implementation, a line width of the antenna coil is greater than or equal to 0.5 mm, and less than or equal to 5 mm, and a line width of the lead wire is greater than or equal to the line width of the antenna coil.

In an alternative implementation, the antenna coil is a planar spiral coil, and a coil spacing of the planar spiral coil is greater than or equal to 0.1 mm, and less than or equal to 1 mm.

In an alternative implementation, an area of the terminal is greater than or equal to 2 mm$^2$.

In an alternative implementation, a film-layer thickness of the antenna functional layer is less than or equal to 8 μm.

The present disclosure provides a displaying module, wherein the displaying module comprises a display panel, an adhesive layer and the thin-film antenna according to any one of the above embodiments, the adhesive layer is for adhering the display panel and the thin-film antenna, the thin-film antenna is located on one side of the display panel that is away from a light-emitting surface, and an active area of the display panel corresponds to the first region of the thin-film antenna.

The present disclosure provides a displaying device, wherein the displaying device comprises a circuit board and the displaying module according to any one of the above embodiments, and the circuit board is connected to the terminal.

In an alternative implementation, the lead-wire layer is close to the display panel, and the second region is bent toward the antenna functional layer and fixed.

In an alternative implementation, when the thin-film antenna further comprises a third film layer provided on one side of the lead-wire layer that is away from the antenna functional layer, a third adhesive film is provided on one side of the third film layer that is away from the lead-wire layer, and the third adhesive film is located within the second region.

In an alternative implementation, an elasticity modulus of the third adhesive film is greater than or equal to 200 Kpa, and less than or equal to 600 Kpa.

In an alternative implementation, the antenna functional layer is close to the display panel, and the second region is bent toward the lead-wire layer and fixed.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly introduced below. Apparently, the figures that are described below are embodiments of the present disclosure, and a person skilled in the art may obtain other figures according to these figures without paying creative work.

DETAILED DESCRIPTION OF THE EMBODIMENTS

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
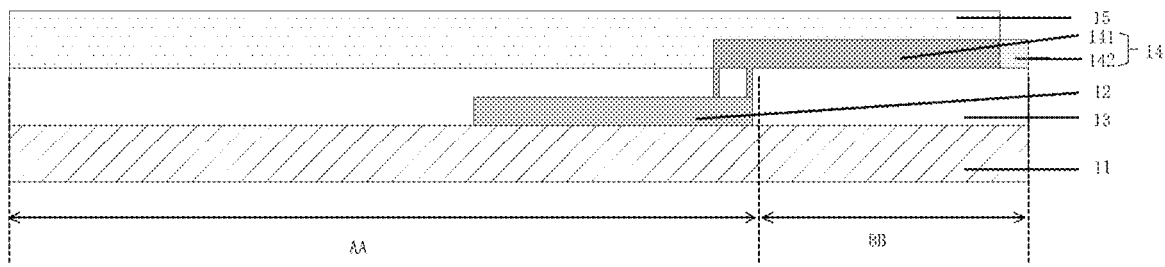
FIG. 1 shows a schematic sectional structural diagram of the first type of the thin-film antenna according to an embodiment of the present disclosure.
Figure 2:
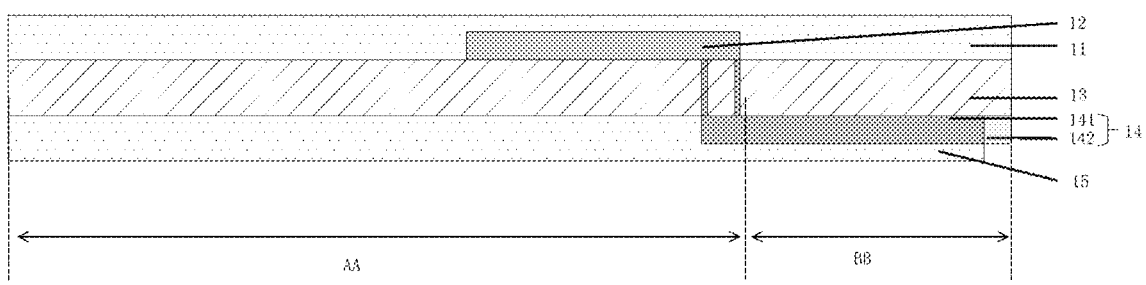
FIG. 2 shows a schematic sectional structural diagram of the second type of the thin-film antenna according to an embodiment of the present disclosure.

A thin-film antenna is provided by an embodiment of the present disclosure. Referring to FIG. 1 and FIG. 2, a schematic sectional structural diagrams of a thin-film antenna is shown according to the present embodiment. The thin-film antenna includes a first region AA and a second region BB.

As shown in FIG. 1 and FIG. 2, the thin-film antenna includes: an antenna functional layer 12, a first film layer 13 and a lead-wire layer 14 that are arranged in stack. The antenna functional layer 12 includes an antenna coil, the antenna coil is located within the first region AA, the lead-wire layer 14 includes a lead wire 141 and a terminal 142 connected to the lead wire 141, the terminal 142 is located within the second region BB, and the lead wire 141 and the antenna coil are connected by a via hole provided in the first film layer 13.

One end of the lead wire 141 is connected to the terminal 142, and the other end is connected to the antenna coil by a via hole provided in the first film layer 13.

In the present embodiment, the second region BB may be bent, which may reduce the room occupied by the thin-film antenna in the displaying device.

The first region AA is bendable or unbendable according to practical demands, which is not limited in the present embodiment.

The terminal 142 is used to be directly connected to the circuit board, and may omit the components connected between the antenna and the circuit board in the related art, thereby reducing the contact resistance, and increasing the antenna efficiency.

The thin-film antenna according to the present embodiment may be adhered to the back surface of the display panel, i.e., the side opposite to the light-emitting surface. Therefore, not only the space occupation of the antenna may be reduced, to reduce the thickness of the displaying module, but also the components for shielding signals such as a middle frame is not required to be provided between the antenna and the display panel. Therefore, the antenna function may be directly used at the screen side. For terminal devices with a screen folding outwardly, functions such as NFC identification and so on may be directly performed in the folding state, which improves the usage convenience.

Figure 3:
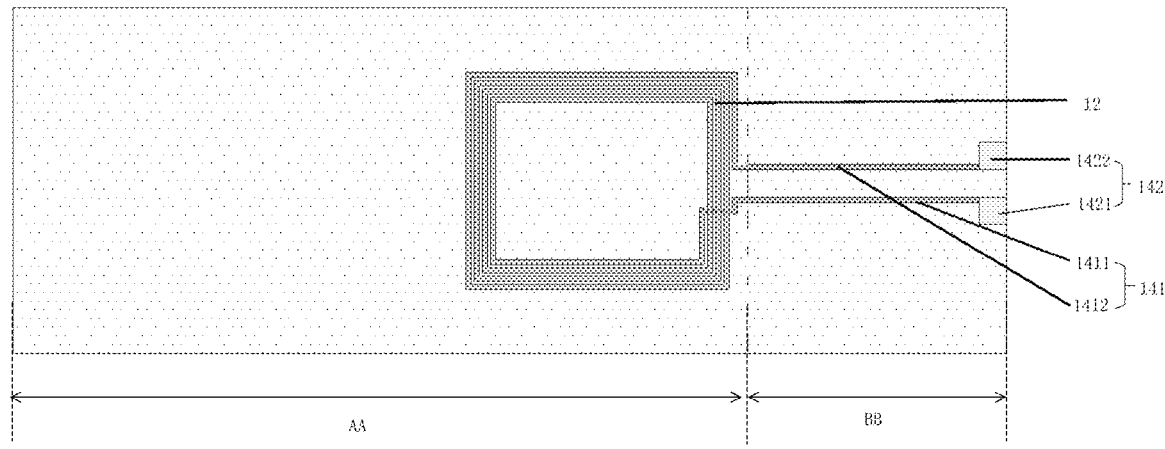
FIG. 3 shows a schematic planar structural diagram of the first type of the thin-film antenna according to an embodiment of the present disclosure.
Figure 4:
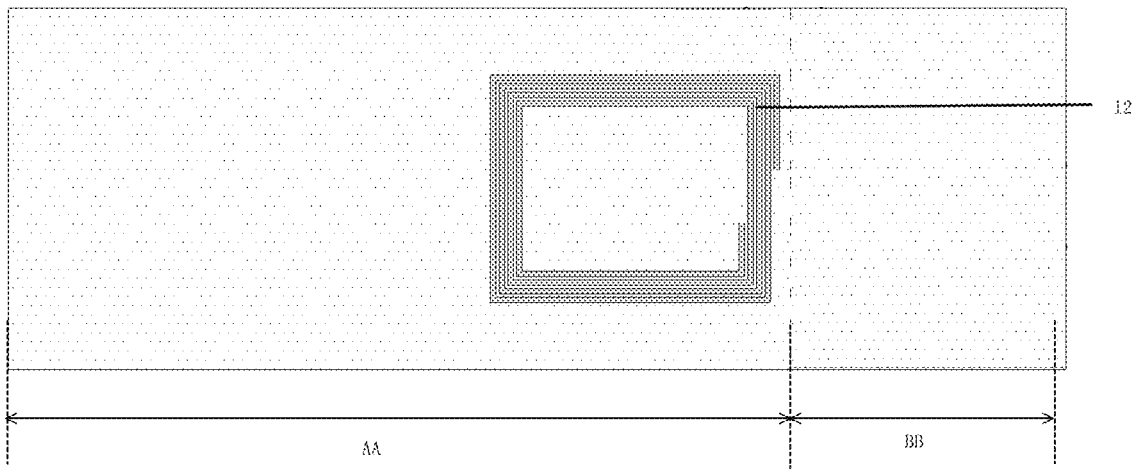
FIG. 4 shows a first schematic planar structural diagram of the second type of the thin-film antenna according to an embodiment of the present disclosure.
Figure 5:
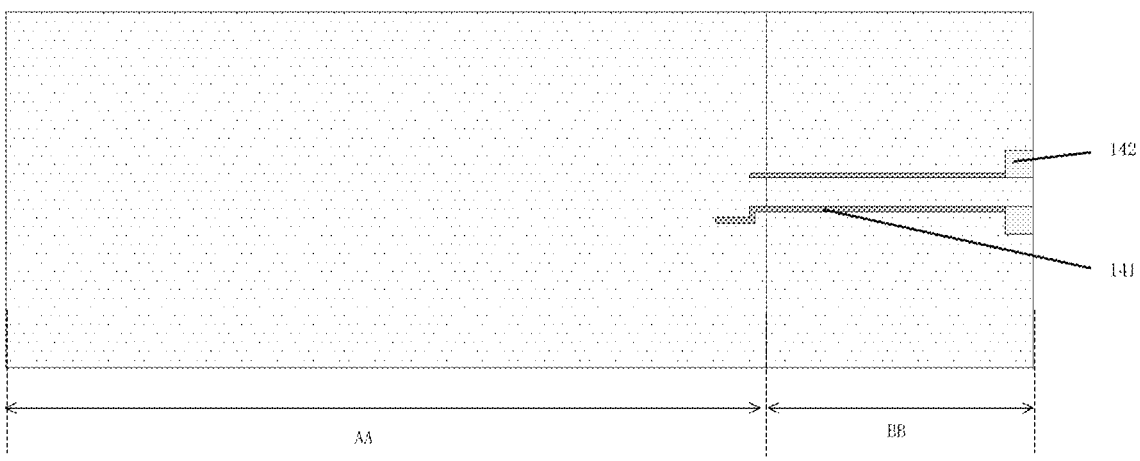
FIG. 5 shows a second schematic planar structural diagram of the second type of the thin-film antenna according to an embodiment of the present disclosure.
Figure 6:
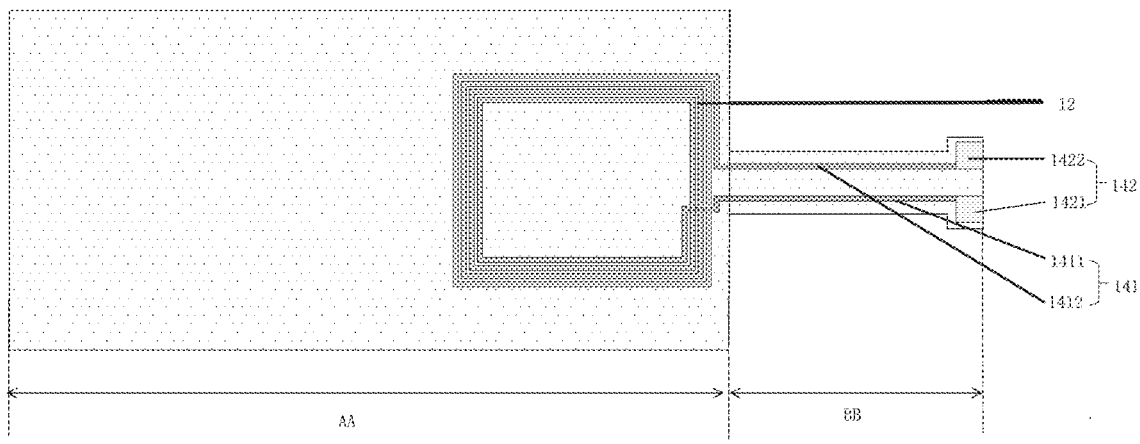
FIG. 6 shows a schematic planar structural diagram obtained after the first type of the thin-film antenna has been cut according to an embodiment of the present disclosure.

FIG. 3 shows a schematic planar structural diagram of the thin-film antenna shown in FIG. 1. FIG. 4 and FIG. 5 show schematic planar structural diagrams of the thin-film antenna shown in FIG. 2. In a particular implementation, in order to further reduce the space occupation by the thin-film antenna, the second region of the thin-film antenna may be further cut. For example, by cutting the thin-film antenna shown in FIG. 3, the thin-film antenna shown in FIG. 6 may be obtained.

In the present embodiment, by providing the antenna coil, the lead wire 141 and the terminal 142 into the integral structure of the thin-film antenna, the circuit board may be directly connected to the terminal 142 by modes such as welding or crimping, so as to omit the components connected between the terminal 142 and the circuit board, to prevent problems such as a high Anisotropic Conductive Film (ACF) impedance or a high FPC wiring resistance loss, to minimize the resistance loss, to prevent affecting the antenna efficiency due to a too large resistance loss.

The material of the antenna functional layer 12 may be a metal such as Cu and Ag, and may also be a non-metallic material having a high electric conductivity and a low sheet resistance such as graphene, which is not limited in the present embodiment. When the material of the antenna functional layer 12 is a metal, it may be manufactured by using thin-film processes such as sputtering.

In order to make the thin-film antenna flexible, the film-layer thickness of the antenna functional layer 12 may be less than or equal to 8 μm.

The material of the lead wire 141 may be a metal such as Cu and Ag, and may also be a non-metallic material having a high electric conductivity and a low sheet resistance such as graphene, which is not limited in the present embodiment.

The material of the terminal 142 may be a metal such as Cu and Ag. In a particular implementation, gold may be plated to the surface of the metal, to reduce the contact resistance.

Referring to FIG. 1 and FIG. 2, a second film layer 11 may be provided on the side of the antenna functional layer 12 that is away from the lead-wire layer 14. A third film layer 15 may be provided on the side of the lead-wire layer 14 that is away from the antenna functional layer 12.

In order to expose the terminal 142, to facilitate the connection with the other components such as the circuit board, referring to FIG. 1 and FIG. 2, the orthographic projection of the third film layer 15 on the first film layer 13 and the orthographic projection of the terminal 142 on the first film layer 13 may not overlap.

The orthographic projection of the second film layer 11 on the first film layer 13 may cover the orthographic projections of the antenna functional layer 12 and the lead-wire layer 14 on the first film layer 13.

The thin-film antenna according to the present embodiment may be obtained by using various manufacturing methods.

In an alternative implementation, the thin-film antenna may be formed by performing a patterning process on one side of the second film layer 11. Particularly, the antenna functional layer 12 may be firstly formed on one side of the second film layer 11 and at the position corresponding to the first region AA; then the first film layer 13 is formed on the antenna functional layer 12; then the lead wire 141 and the terminal 142 are formed on the first film layer 13, wherein the lead wire 141 is connected to the antenna coil in the antenna functional layer 12 by a via hole in the first film layer 13; and then the third film layer 15 is formed on the lead-wire layer 14, to obtain the thin-film antenna shown in FIG. 1. Referring to FIG. 3, which shows a schematic planar structural diagram of the thin-film antenna according to the present implementation.

In the present implementation, the second film layer 11 may be a polymer thin film matrix such as polyimide, which is not limited in the present implementation. The second film layer 11 is equivalent to the substrate, and the antenna functional layer 12 and the lead-wire layer 14 are located on the same side of the second film layer 11, i.e., the substrate, as shown in FIG. 1 and FIG. 3.

The first film layer 13 plays a role as insulation, it may be an inorganic thin film such as SiOx and SiN, and may also be a polymer thin film such as a UV adhesive and polyimide, which is not limited in the present implementation.

The material of the third film layer 15 may be a UV adhesive and so on, and may also be a polymer material such as a UV-solidified polyimide and acrylate, which is not limited in the present implementation. The third film layer 15 plays a role to planarize the surface of the thin-film antenna, which may improve the adhesion flatness in the subsequent adhering process.

In another alternative implementation, the thin-film antenna may be formed by performing a two-side patterning process on the two sides of the first film layer 13, which facilitates to further reduce the thickness of the thin-film antenna, and simplify the manufacturing processes. Particularly, the antenna functional layer 12 is firstly formed on one side of the first film layer 13 and at the position corresponding to the first region AA; then the via hole is formed in the first film layer 13 by using processes such as laser drilling, and then the lead wire 141 and the terminal 142 are formed on the other side of the first film layer 13 which is the side away from the antenna functional layer 12 by using modes such as injection of an electrical conductive material into the hole or precipitation, wherein the lead wire 141 is connected to the antenna coil in the antenna functional layer 12 by the via hole in the first film layer 13; and then the second film layer 11 is formed on the side of the antenna functional layer 12 that is away from the first film layer 13, and the third film layer 15 is formed on the side of the lead-wire layer 14 that is away from the first film layer 13, to obtain the thin-film antenna shown in FIG. 2.

Referring to FIG. 4, which shows a first schematic planar structural diagram of the thin-film antenna according to the present implementation. FIG. 5 shows a second schematic planar structural diagram of the thin-film antenna according to the present implementation.

In the present implementation, the material of the second film layer 11 may be an inorganic thin film such as SiOx and SUN, and may also be a polymer material such as a UV adhesive, polyimide and acrylate, which is not limited in the present implementation. The second film layer 11 plays a role to planarize the surface of the thin-film antenna, which may improve the adhesion flatness in the subsequent adhering process.

The first film layer 13 may be a polymer insulating film matrix such as polyimide, which is not limited in the present implementation. The first film layer 13 is equivalent to the substrate, and the antenna functional layer 12 and the lead-wire layer 14 are located on the two sides of the first film layer 13, i.e., the substrate, as shown in FIGS. 1, 4 and 5.

The material of the third film layer 15 may be an inorganic thin film such as SiOx and SiN, and may also be a polymer material such as a UV adhesive, polyimide and acrylate, which is not limited in the present implementation. The third film layer 15 plays a role to planarize the surface of the thin-film antenna, which may improve the adhesion flatness in the subsequent adhering process.

Referring to FIG. 3, the lead wire 141 may include a first lead wire 1411 and a second lead wire 1412, and the terminal 142 may include a first terminal 1421 and a second terminal 1422. A first end of the first lead wire 1411 is connected to the first terminal 1421, and a second end is connected to a head end of the antenna coil. A first end of the second lead wire 1412 is connected to the second terminal 1422, and a second end is connected to a tail end of the antenna coil.

In a particular implementation, the first end of the first lead wire 1411 and the head end of the antenna coil may be connected by a first via hole provided in the first film layer 13. The first end of the second lead wire 1412 and the tail end of the antenna coil may be connected by a second via hole provided in the first film layer 13.

Figure 7:
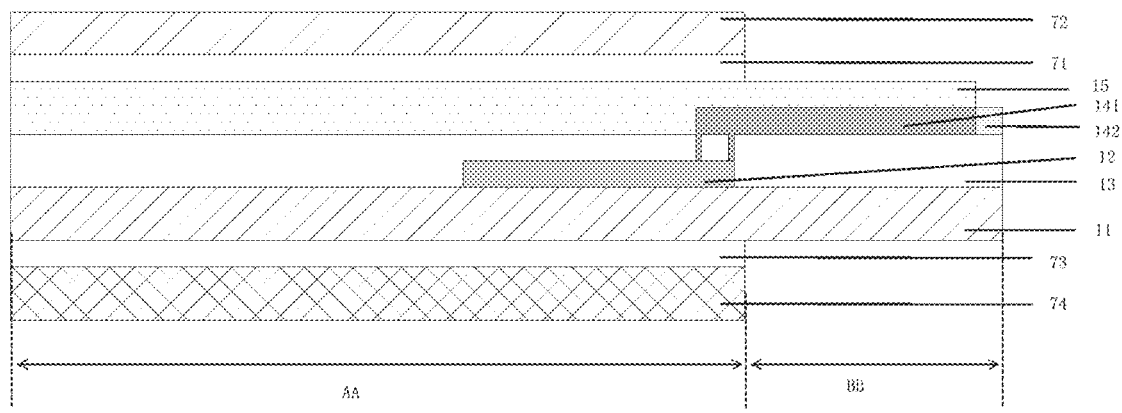
FIG. 7 shows a schematic sectional structural diagram of a thin-film antenna according to an embodiment of the present disclosure.

In an alternative implementation, referring to FIG. 7, a first adhesive film 71 and a release film 72 are provided in stack on the side of the third film layer 15 that is away from the lead-wire layer 14, the first adhesive film 71 is close to the third film layer 15, the release film 72 is for being stripped from the surface of the first adhesive film 71 when adhered to the thin-film antenna, and the first adhesive film 71 and the release film 72 are located within the first region AA. A second adhesive film 73 and a magnetic conductive material layer 74 are provided in stack on the side of the second film layer 11 that is away from the antenna functional layer 12, the second adhesive film 73 is close to the second film layer 11, and the second adhesive film 73 and the magnetic conductive material layer 74 are located within the first region AA.

Figure 8:
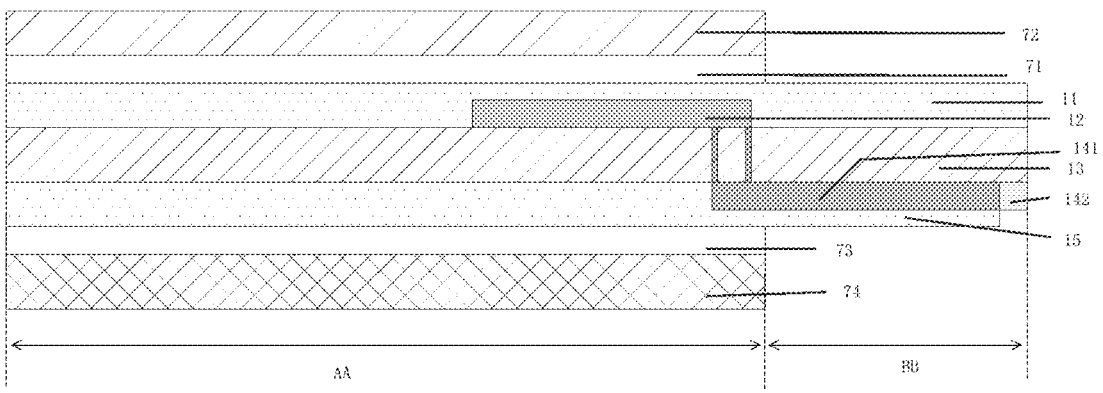
FIG. 8 shows a schematic sectional structural diagram of another thin-film antenna according to an embodiment of the present disclosure.

In another alternative implementation, referring to FIG. 8, a first adhesive film 71 and a release film 72 are provided in stack on the side of the second film layer 11 that is away from the antenna functional layer 12, the first adhesive film 71 is close to the second film layer 11, the release film 72 is for being stripped from the surface of the first adhesive film 71 when adhered to the thin-film antenna, and the first adhesive film 71 and the release film 72 are located within the first region AA. A second adhesive film 73 and a magnetic conductive material layer 74 are provided in stack on the side of the third film layer 15 that is away from the lead-wire layer 14, the second adhesive film 73 is close to the third film layer 15, and the second adhesive film 73 and the magnetic conductive material layer 74 are located within the first region AA.

When the thin-film antenna is being adhered to the display panel, the release film 72 may be stripped from the surface of the first adhesive film 71, whereby the thin-film antenna is adhered to the display panel by using the first adhesive film 71.

The first adhesive film 71 and the second adhesive film 73 are optical-adhesive layers. The material of the magnetic conductive material layer 74 may be an amorphous matter, an iron oxide powder and so on. The magnetic permeability of the magnetic conductive material layer 74 may be greater than or equal to 150 H/m under a frequency of 13.56 Mhz, and a magnetic loss may be may be less than or equal to 100 W/m$^3$.

Figure 9:
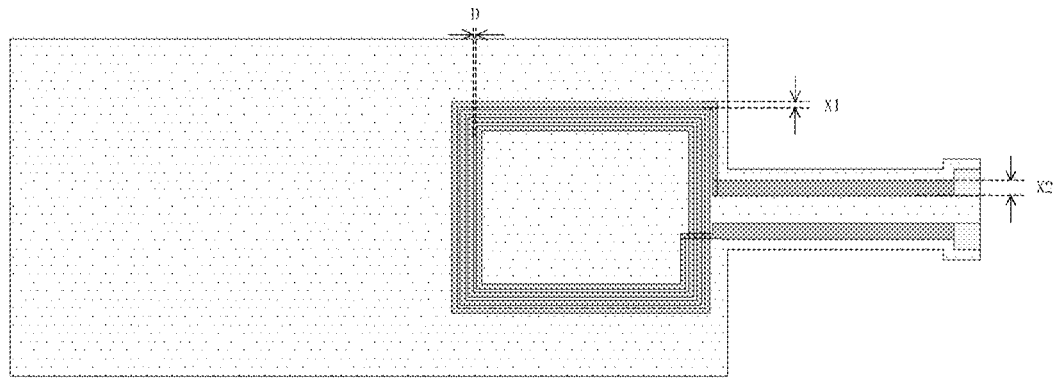
FIG. 9 shows a schematic planar structural diagram of a thin-film antenna according to an embodiment of the present disclosure.

In order to reduce the transmission resistance of the antenna coil, referring to FIG. 9, the line width X1 of the antenna coil may be greater than or equal to 0.5 mm, and less than or equal to 5 mm. Therefore, by increasing the line width of the antenna coil, the cross-sectional area of the antenna coil is increased, thereby reducing the resistance of the antenna coil.

In a particular implementation, the line width X2 of the lead wire 141 may be greater than or equal to the line width X1 of the antenna coil. In order to further reduce the transmission resistance of the lead wire, the line width X2 of the lead wire 141 may be greater than or equal to two times the line width X1 of the antenna coil; for example, the line width X2 of the lead wire 141 may be greater than or equal to 1 mm. Therefore, by increasing the line width of the lead wire 141, the cross-sectional area of the lead wire 141 is increased, thereby reducing the resistance of the lead wire 141.

The antenna coil may be a planar spiral coil, and the coil spacing D of the planar spiral coil may be greater than or equal to 0.1 mm, and less than or equal to 1 mm. The shape of the planar spiral coil may be a rectangle (for example, the shape shown in FIG. 3 and FIG. 4), and may also be a circle and so on, which is not limited in the present embodiment.

In a particular implementation, the area of the terminal 142 may be greater than or equal to 2 mm$^2$. In order to facilitate the welding and further reduce the contact resistance, the area of the terminal 142 may be greater than or equal to 4 mm$^2$.

Figure 10:
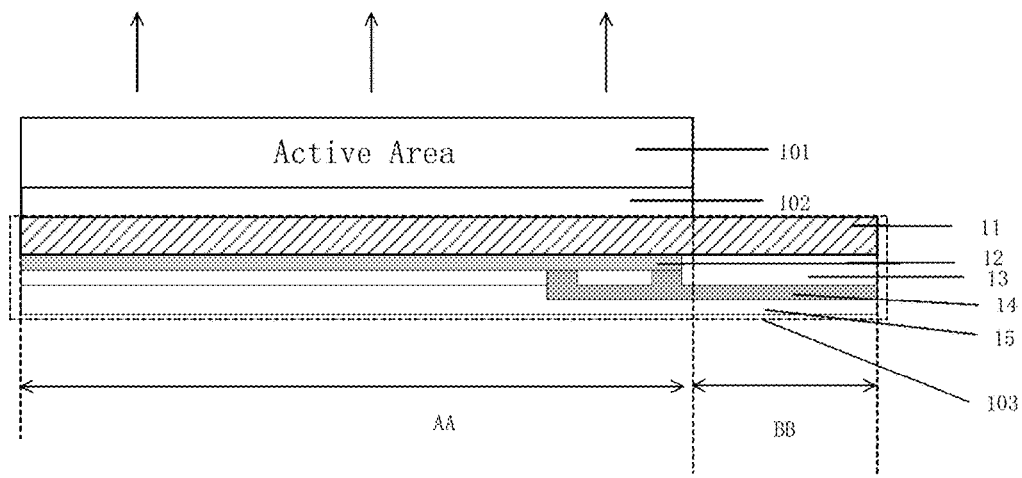
FIG. 10 shows a schematic sectional structural diagram of a displaying module according to an embodiment of the present disclosure.
Figure 11:
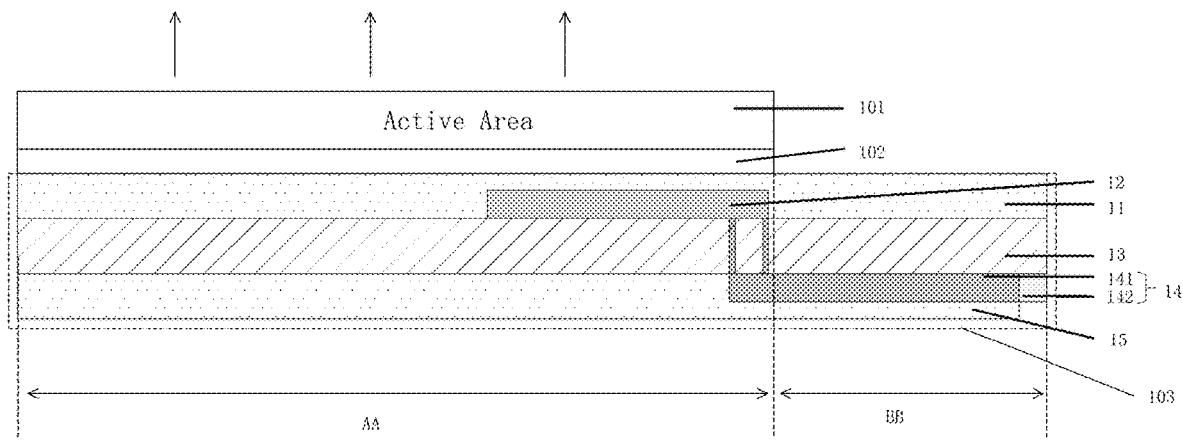
FIG. 11 shows a schematic sectional structural diagram of another displaying module according to an embodiment of the present disclosure.

A displaying module is further provided in another embodiment of the present disclosure. Referring to FIG. 10 and FIG. 11, the displaying module includes a display panel 101, an adhesive layer 102 and the thin-film antenna 103 according to any one of the above embodiments, the adhesive layer 102 is for adhering the display panel 101 and the thin-film antenna 103, the thin-film antenna 103 is located on the side of the display panel 101 that is away from the light-emitting surface, and an active area of the display panel 101 corresponds to the first region AA of the thin-film antenna 103.

In a particular implementation, the antenna functional layer 12 in the thin-film antenna 103 may be close to the display panel 101, for example, the structures shown in FIG. 10 and FIG. 11, and the lead-wire layer 14 may also be close to the display panel 101, which is not limited in the present embodiment.

The display panel 101 may be a panel of a structure of Organic Light Emitting Diode (OLED), and may also be a panel of another structure, which is not limited in the present embodiment.

The adhesive layer 102 may be an optical adhesive, and the particular material of the adhesive layer 102 is not limited in the present embodiment.

When the thin-film antenna 103 includes the first adhesive film 71 and the release film 72, when the thin-film antenna 103 is being adhered to the display panel 101, the release film 72 may be stripped from the surface of the first adhesive film 71 firstly, whereby the thin-film antenna is adhered to the display panel by using the first adhesive film 71. In such a case, the first adhesive film 71 may play a role as the adhesive layer 102.

Figure 12:
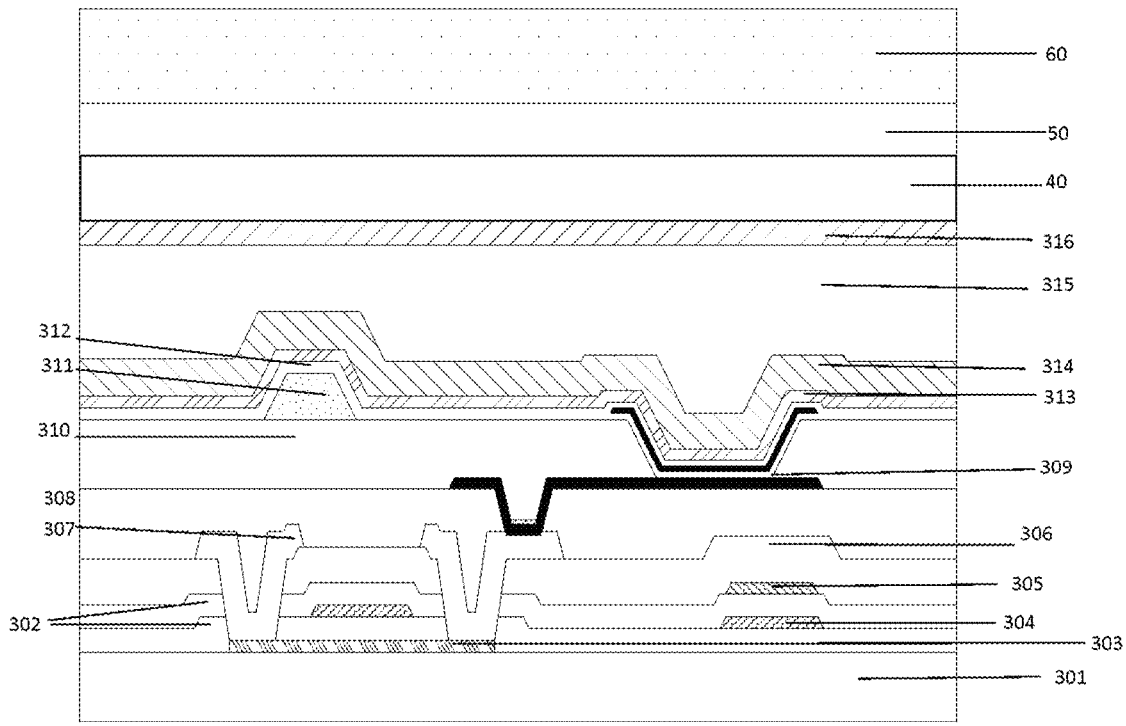
FIG. 12 shows a schematic sectional structural diagram of a display panel according to an embodiment of the present disclosure.

In an alternative implementation, the structure of the display panel 101 is shown in FIG. 12. In FIG. 12, label 301 is a flexible substrate and a buffer layer, label 302 is a grid insulating layer, label 303 is a thin-film-transistor channel formed by a-Si, label 304 is a first grid, label 305 is a second grid, label 306 is an insulating layer, and may be an inorganic film layer, label 307 is a source-drain-electrode electrically conducting channel, label 308 is a planarization layer, label 309 is an anode film layer, label 310 is a pixel defining region, label 311 is a separating support, label 312 is a luminescent material organic film layer, label 313 is a cathode film layer, label 314 is a first inorganic packaging layer, label 315 is a second organic packaging layer, label 316 is a third inorganic packaging layer, label 40 is a functional film material such as a polarizer, label 50 is an optical-adhesive layer, and label 60 is a window film.

Optionally, when the display panel 101 is a foldable or rollable display panel, correspondingly, the first region AA of the thin-film antenna 103 is foldable or rollable.

Figure 13:
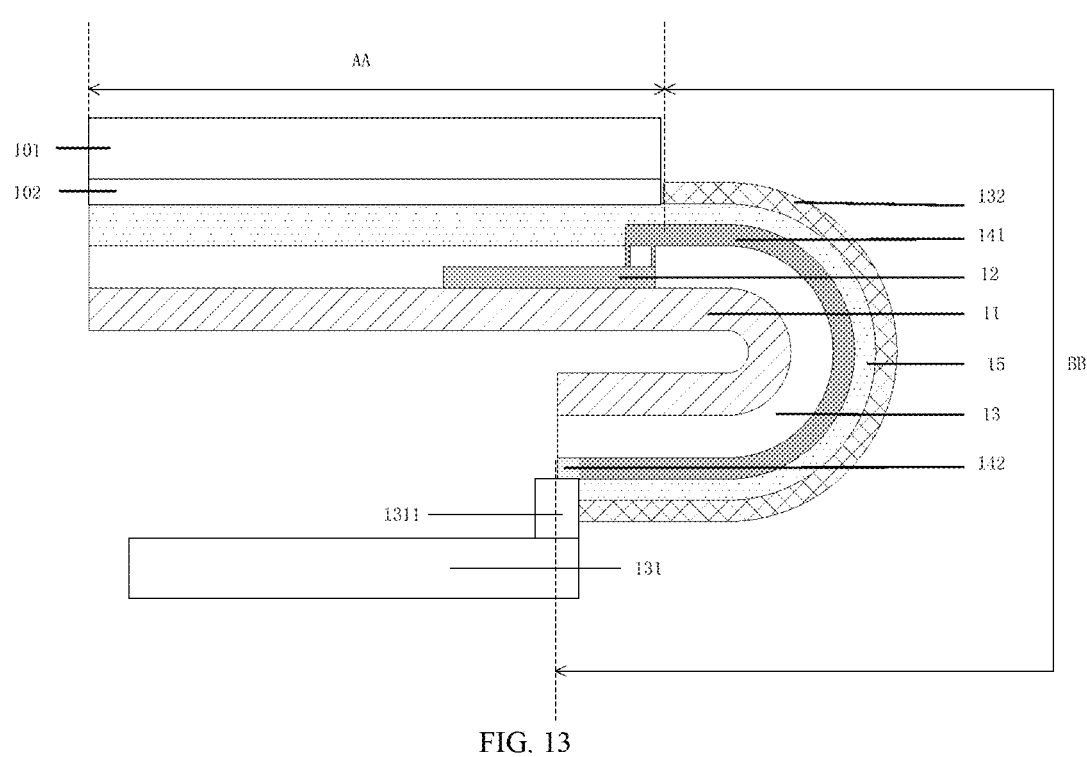
FIG. 13 shows a schematic sectional structural diagram of the first type of the displaying device according to an embodiment of the present disclosure.
Figure 14:
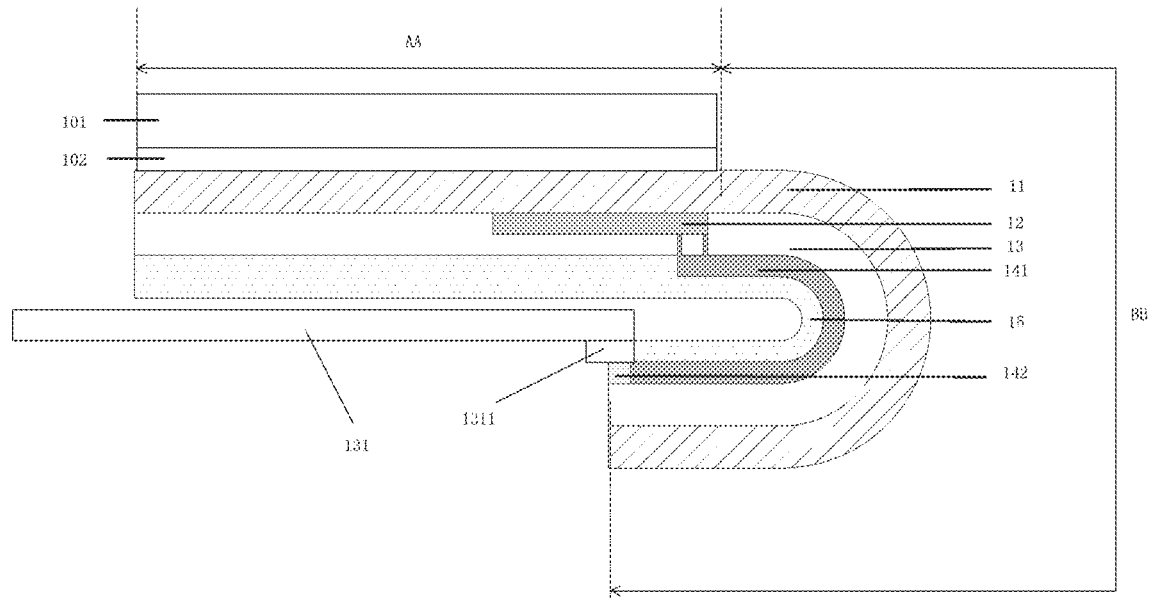
FIG. 14 shows a schematic sectional structural diagram of the second type of the displaying device according to an embodiment of the present disclosure.
Figure 15:
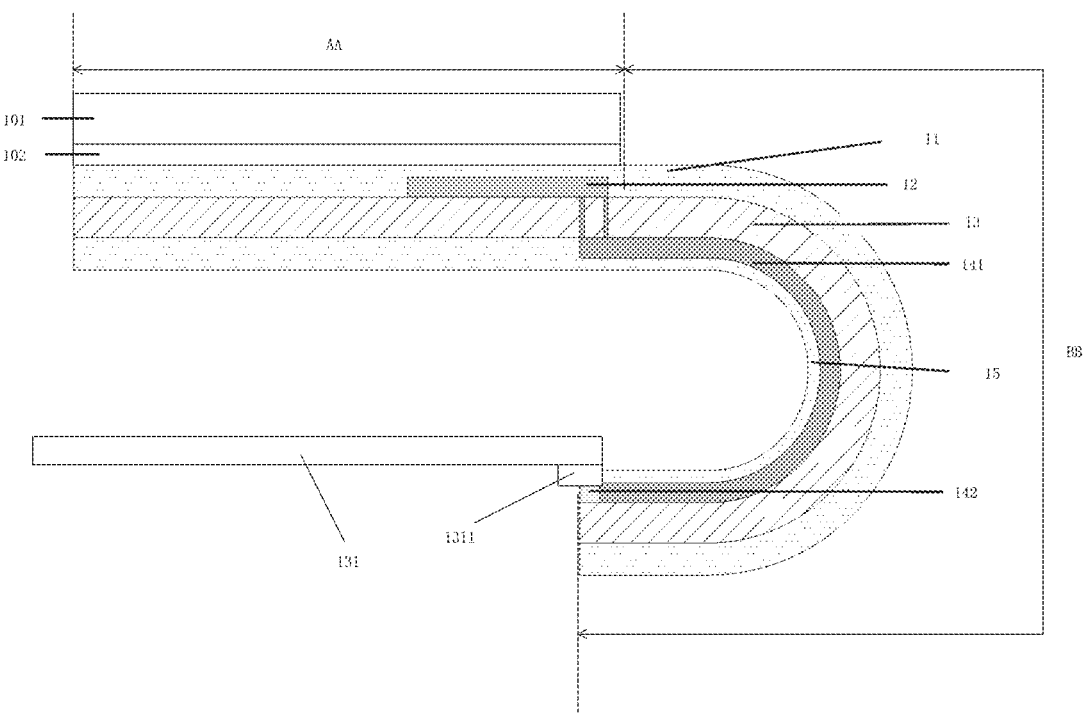
FIG. 15 shows a schematic sectional structural diagram of the third type of the displaying device according to an embodiment of the present disclosure.

A displaying device is further provided by another embodiment of the present disclosure. Referring to FIG. 13 to FIG. 15, the displaying device may include a circuit board 131 and the displaying module according to any one of the above embodiments, and the circuit board 131 is connected to the terminal 142.

It should be noted that the displaying device according to the present embodiment may be any products or components that have the function of 2D or 3D displaying, such as an electronic paper, a mobile phone, a tablet personal computer, a TV set, a notebook computer, a digital photo frame and a navigator.

In a particular implementation, the circuit board 131 may be directly welded or crimped to the terminal 142 by using a joining point 1311 on the circuit board 131, and the connection between the circuit board 131 and the thin-film antenna 103 does not require another component, which may reduce the resistance loss to a large extent.

In the displaying device, the second region BB of the thin-film antenna 103 may be in a bending state, wherein the second region BB is bent toward the side opposite to the display panel 101, which may reduce the room occupied by the thin-film antenna 103 in the displaying device, and reduce the border frame of the displaying device.

In an alternative implementation, as shown in FIG. 13, the lead-wire layer 14 may be close to the display panel 101, and the second region BB is bent toward the antenna functional layer 12 and fixed.

In the present implementation, the display panel 101 is provided on the side of the lead-wire layer 14 that is away from the antenna functional layer 12. The second region BB is bent toward the side opposite to the lead-wire layer 14, and the bending direction of the second region BB is shown in FIG. 13. In such a case, the joining point 1311 of the circuit board 131 faces the display panel 101 and is fixedly connected to the bent terminal 142 by modes such as welding and crimping.

When the thin-film antenna 103 further includes a third film layer 15 provided on the side of the lead-wire layer 14 that is away from the antenna functional layer 12, as shown in FIG. 13, because there is merely one third film layer 15 on the outer side of the lead wire 141, the lead damages such as cracking may happen to the lead wire 141 in the bending process. In order to prevent damages such as cracking of the lead wire 141, as shown in FIG. 13, a third adhesive film 132 may be provided on the side of the third film layer 15 that is away from the lead-wire layer 14, and the third adhesive film 132 is located within the second region BB.

The elasticity modulus of the third adhesive film 132 may be greater than or equal to 200 Kpa, and less than or equal to 600 Kpa.

By spread-coating the third adhesive film 132 onto the surface of the third film layer 15 within the third film layer 15, the probability of crack of the lead wire 141 during bending or using process may be reduced.

In another alternative implementation, as shown in FIGS. 14 and 15, the antenna functional layer 12 may be close to the display panel 101, and the second region BB is bent toward the lead-wire layer 14 and fixed.

In the present implementation, the display panel 101 is provided on the side of the antenna functional layer 12 that is away from the lead-wire layer 14. The second region BB is bent toward the side opposite to the antenna functional layer 12, and the bending direction of the second region BB is shown in FIG. 14 and FIG. 15. In such a case, the joining point 1311 of the circuit board 131 is back away from the display panel 101 and fixedly connected to the bent terminal 142 by modes such as welding and crimping.

As shown in FIG. 14 and FIG. 15, when the second film layer 11 is provided on the side of the antenna functional layer 12 that is away from the lead-wire layer 14, because the first film layer 13 and the second film layer 11 are provided on the outer side of the lead wire 141, the lead wire 141 is well protected, which reduces the probability of crack of the lead wire 141 during bending or using process, to improve the reliability.

The technical solutions of the present disclosure provide a thin-film antenna, a displaying module and a displaying device, wherein the thin-film antenna includes a first region and a second region, and the thin-film antenna includes: an antenna functional layer, a first film layer and a lead-wire layer that are arranged in stack; and the antenna functional layer includes an antenna coil, the antenna coil is located within the first region, the lead-wire layer includes a lead wire and a terminal connected to the lead wire, the terminal is located within the second region, and the lead wire and the antenna coil are connected by a via hole provided in the first film layer. The thin-film antenna according to the present embodiment may be adhered to the back surface of the display panel, and the component for shielding signals such as a middle frame is not required to be provided between the antenna and the display panel. Therefore, the antenna function may be directly used at the screen side. For terminal devices with a screen folding outwardly, functions such as NFC identification and so on may be directly performed in the folding state, which improves the usage convenience.

The embodiments of the description are described in the mode of progression, each of the embodiments emphatically describes the differences from the other embodiments, and the same or similar parts of the embodiments may refer to each other.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "comprising a . . . " does not exclude additional same element in the process, method, article or device comprising the element.

The thin-film antenna, the displaying module and the displaying device according to the present disclosure have been described in detail above. The principle and the embodiments of the present disclosure are described herein with reference to the particular examples, and the description of the above embodiments is merely intended to facilitate to understand the method according to the present disclosure and its core concept. Moreover, for a person skilled in the art, according to the concept of the present disclosure, the particular embodiments and the range of application may be varied. In conclusion, the contents of the description should not be understood as limiting the present disclosure.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it may be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "include" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail with reference to the above embodiments, a person skilled in the art should understand that he may still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. A thin-film antenna, wherein the thin-film antenna comprises a first region and a second region, and the thin-film antenna comprises: an antenna functional layer, a first film layer and a lead-wire layer that are arranged in stack; and the antenna functional layer comprises an antenna coil, the antenna coil is located within the first region, the lead-wire layer comprises a lead wire and a terminal connected to the lead wire, the terminal is located within the second region, and the lead wire and the antenna coil are connected by a via hole provided on the first film layer;

wherein a second film layer is provided on one side of the antenna functional layer that is away from the lead-wire layer, and a third film layer is provided on one side of the lead-wire layer that is away from the antenna functional layer;

a first adhesive film and a release film are provided in stack on one side of the third film layer that is away from the lead-wire layer, the first adhesive film is directly adjacent to the third film layer, the release film is for being stripped from a surface of the first adhesive film when adhered to the thin-film antenna, and the first adhesive film and the release film are located within the first region; and a second adhesive film and a magnetic conductive material layer are provided in stack on one side of the second film layer that is away from the antenna functional layer, the second adhesive film is directly adjacent to the second film layer, and the second adhesive film and the magnetic conductive material layer are located within the first region.

2. The thin-film antenna according to claim 1, wherein the lead wire comprises a first lead wire and a second lead wire, and the terminal comprises a first terminal and a second terminal;

a first end of the first lead wire is connected to the first terminal, and a second end of the first lead wire is connected to a head end of the antenna coil; and a first end of the second lead wire is connected to the second terminal, and a second end of the second lead wire is connected to a tail end of the antenna coil.

3. The thin-film antenna according to claim 1, wherein a first adhesive film and a release film are provided in stack on one side of the second film layer that is away from the antenna functional layer, the first adhesive film is directly adjacent to the second film layer, the release film is for being stripped from a surface of the first adhesive film when adhered to the thin-film antenna, and the first adhesive film and the release film are located within the first region; and a second adhesive film and a magnetic conductive material layer are provided in stack on one side of the third film layer that is away from the lead-wire layer, the second adhesive film is directly adjacent to the third film layer, and the second adhesive film and the magnetic conductive material layer are located within the first region.

4. The thin-film antenna according to claim 1, wherein a magnetic permeability of the magnetic conductive material layer is greater than or equal to 150 H/m under a frequency of 13.56 Mhz, and a magnetic loss is less than or equal to 100 W/m$^3$.

5. The thin-film antenna according to claim 1, wherein an orthographic projection of the third film layer on the first film layer and an orthographic projection of the terminal on the first film layer do not overlap.

6. The thin-film antenna according to claim 1, wherein a line width of the antenna coil is greater than or equal to 0.5 mm, and less than or equal to 5 mm, and a line width of the lead wire is greater than or equal to the line width of the antenna coil.

7. The thin-film antenna according claim 1, wherein the antenna coil is a planar spiral coil, and a coil spacing of the planar spiral coil is greater than or equal to 0.1 mm, and less than or equal to 1 mm.

8. The thin-film antenna according to claim 1, wherein an area of the terminal is greater than or equal to 2 mm$^2$.

9. The thin-film antenna according to claim 1, wherein a film-layer thickness of the antenna functional layer is less than or equal to 8 μm.

10. A displaying module, wherein the displaying module comprises a display panel, an adhesive layer and the thin-film antenna according to claim 1, the adhesive layer is for adhering the display panel and the thin-film antenna, the thin-film antenna is located on one side of the display panel that is away from a light-emitting surface, and an active area of the display panel corresponds to the first region of the thin-film antenna.

11. A displaying device, wherein the displaying device comprises a circuit board and the displaying module according to claim 10, and the circuit board is connected to the terminal.

12. The displaying device according to claim 11, wherein the lead-wire layer is close to the display panel, the adhesive layer is arranged between the lead-wire layer and the display panel, and the second region is bent toward the antenna functional layer and fixed.

13. The displaying device according to claim 12, wherein when the thin-film antenna further comprises a third film layer provided on one side of the lead-wire layer that is away from the antenna functional layer, a third adhesive film is provided on one side of the third film layer that is away from the lead-wire layer, and the third adhesive film is located within the second region.

14. The displaying device according to claim 13, wherein an elasticity modulus of the third adhesive film is greater than or equal to 200 Kpa, and less than or equal to 600 Kpa.

15. The displaying device according to claim 11, wherein the antenna functional layer is close to the display panel, the second film layer and the adhesive layer are arranged between the antenna functional layer and the display panel, and the second region is bent toward the lead-wire layer and fixed.

* * * * *